(12) United States Patent
Okada et al.

(10) Patent No.: US 8,607,758 B2
(45) Date of Patent: Dec. 17, 2013

(54) MOTORCYCLE ENGINE

(75) Inventors: Nozomi Okada, Tokyo (JP); Shinsuke Yasui, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 729 days.

(21) Appl. No.: 12/542,094

(22) Filed: Aug. 17, 2009

(65) Prior Publication Data
US 2010/0071647 A1 Mar. 25, 2010

(30) Foreign Application Priority Data

Sep. 25, 2008 (JP) ................................. 2008-245486

(51) Int. Cl.
*F02F 1/42* (2006.01)
(52) U.S. Cl.
USPC ................. 123/193.3; 123/193.5; 123/195 A; 180/311
(58) Field of Classification Search
USPC ................... 123/193.3, 193.5, 195 R, 195 A; 180/311, 312
See application file for complete search history.

(56) References Cited

U.S. PATENT DOCUMENTS

| | | | | |
|---|---|---|---|---|
| 6,142,123 A * | 11/2000 | Galasso et al. | ................. | 123/486 |
| 6,463,899 B2 * | 10/2002 | Tanaka et al. | ................. | 123/90.4 |
| 6,561,153 B2 * | 5/2003 | Uchida | ................. | 123/193.5 |
| 6,945,232 B2 * | 9/2005 | Ikeda et al. | ................. | 123/470 |
| 6,948,470 B2 * | 9/2005 | Tsutsumi et al. | ................. | 123/193.5 |
| 7,171,938 B2 * | 2/2007 | Muramatsu | ................. | 123/196 R |
| 7,337,755 B2 * | 3/2008 | Gokan et al. | ................. | 123/41.01 |
| 7,438,040 B2 * | 10/2008 | Sugita et al. | ................. | 123/195 R |
| 7,546,818 B2 * | 6/2009 | Hirayama et al. | ................. | 123/41.01 |
| 7,571,714 B2 * | 8/2009 | Miyashiro | ................. | 123/470 |
| 7,673,609 B2 * | 3/2010 | Inui et al. | ................. | 123/193.5 |
| 7,703,423 B2 * | 4/2010 | Burgess et al. | ................. | 123/54.4 |
| 8,033,355 B2 * | 10/2011 | Tokisato | ................. | 180/219 |
| 2004/0069250 A1 * | 4/2004 | Aichinger et al. | ................. | 123/1 A |
| 2007/0074681 A1 * | 4/2007 | Shiozaki et al. | ................. | 123/41.1 |
| 2007/0227509 A1 * | 10/2007 | Ueda et al. | ................. | 123/509 |
| 2010/0242914 A1 * | 9/2010 | Negoro et al. | ................. | 123/445 |

FOREIGN PATENT DOCUMENTS

| | | |
|---|---|---|
| JP | 11-278356 A | 10/1999 |
| JP | 2006-144999 A | 6/2006 |
| JP | 2007-262931 A | 10/2007 |
| JP | 2007-290640 A | 11/2007 |

* cited by examiner

*Primary Examiner* — Noah Kamen
*Assistant Examiner* — Grant Moubry
(74) *Attorney, Agent, or Firm* — Birch, Stewart, Kolasch & Birch, LLP

(57) ABSTRACT

A motorcycle engine includes a cylinder block with an axis extending perpendicularly or slightly inclined forwardly. A cylinder head includes an intake port, an exhaust port disposed on a front surface of the cylinder head opposite the intake port, an engine hanger boss, a coolant temperature sensor mounting portion, and a cam chain tensioner lifter. The intake port has an outer opening having a center disposed on a level upward of a center of an outer opening of the exhaust port. The engine hanger boss is provided on either side of the cylinder head, has a centerline that crosses the intake port, and disposed upwardly of an upper end of the outer opening of the exhaust port. The cam chain tensioner lifter and the coolant temperature sensor are in an overlapping position in a side view, downwardly of the engine hanger boss and an open end of the intake port.

22 Claims, 6 Drawing Sheets

MOTORCYCLE ENGINE

The present application claims priority under 35 USC 119 to Japanese Patent Application No. 2008-245486 filed on Sep. 25, 2008 the entire contents of which are hereby incorporated by reference.

BACKGROUND OF THE INVENTION

1. Field of the Invention

The present invention relates in general to a motorcycle engine having a tensioner lifter, a coolant temperature sensor, and other auxiliaries. More specifically, to an arrangement of the auxiliaries.

2. Description of Background Art

In a large-sized engine having four cylinders arranged crosswise relative to the direction of travel of the vehicle, it is easy to dispose a coolant temperature sensor or a cam chain tensioner lifter in a cylinder head. See, for example, Japanese Patent Laid-open No. 2007-262931 (FIGS. 1 and 2). In a small-sized engine, such as a single-cylinder engine, used in a sports motorcycle for off-road operation, however, it is difficult to dispose the tensioner lifter, coolant temperature sensor, and other auxiliaries in the cylinder head due to a small space available in the cylinder head. The auxiliaries are therefore disposed in a cylinder block. See, for example, Japanese Patent Laid-open No. 2007-290640 (FIG. 2).

SUMMARY AND OBJECTS OF THE INVENTION

With the cam chain tensioner lifter, oscillation of the cam chain can be made smaller if a point near a movable end of the cam chain tensioner is pressed. The movable end is located at an upper end of the cam chain tensioner. More specifically, inside the cylinder head. The coolant temperature to be measured with the coolant temperature sensor is located near a combustion chamber at which the coolant temperature is the highest and the location is again inside the cylinder head. It is therefore an object of an embodiment of the present invention to provide a structure that allows the cam chain tensioner lifter, the coolant temperature sensor, and other auxiliaries to be disposed in the cylinder head.

The present invention has been made to solve the foregoing problem, according to an embodiment of the present invention, there is provided a motorcycle engine that includes a cylinder block disposed in a vehicle to have an axis extending perpendicularly or slightly inclined forwardly; and a cylinder head. Further, the cylinder head includes an intake port; an exhaust port disposed on a front surface of the cylinder head opposite the intake port; an engine hanger boss; a coolant temperature sensor mounting portion and a cam chain tensioner lifter. In this engine, the intake port has an outer opening having a center disposed on a level upward of a center of an outer opening of the exhaust port; the engine hanger boss is provided on either side of the cylinder head, has a centerline that crosses the intake port, and is disposed upwardly of an upper end of the outer opening of the exhaust port; and the cam chain tensioner lifter and the coolant temperature sensor are disposed at an overlapping position in a side view, downwardly of the engine hanger boss and an open end of the intake port.

According to an embodiment of the present invention, a joint surface between the cylinder head and the cylinder head cover is inclined such that a rear joint surface is higher than a front joint surface; and an upper end of the outer opening of the intake port is disposed near the rear joint surface.

According to an embodiment of the present invention, a pair of engine hanger bosses is indisposed, each being disposed on either side of the cylinder head. This allows an intake path to be disposed in a space between the two engine hanger bosses. Further, the engine hanger bosses and the intake port outer opening are disposed on a relatively high level of the cylinder head, so that the engine hanger bosses are disposed near a frame. The engine hanger can therefore be built compactly and with a reduced weight. The intake port near the intake valve can be shaped substantially straight, which helps improve intake efficiency.

The coolant temperature sensor and the cam chain tensioner lifter are disposed downwardly of the engine hanger boss and the intake port outer opening. This allows the coolant temperature sensor and the cam chain tensioner lifter to be compactly disposed in the cylinder head without having to enlarge the cylinder head.

According to an embodiment of the present invention, the exhaust port of the cylinder head is disposed at a low level, while disposing the intake port at an upper portion of the cylinder head. The intake port outer opening, the engine hanger boss, the coolant temperature sensor, and the cam chain tensioner lifter are thereby disposed centrally in the rear portion of the cylinder head. This helps suppress an increase in the mass of the cylinder head.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
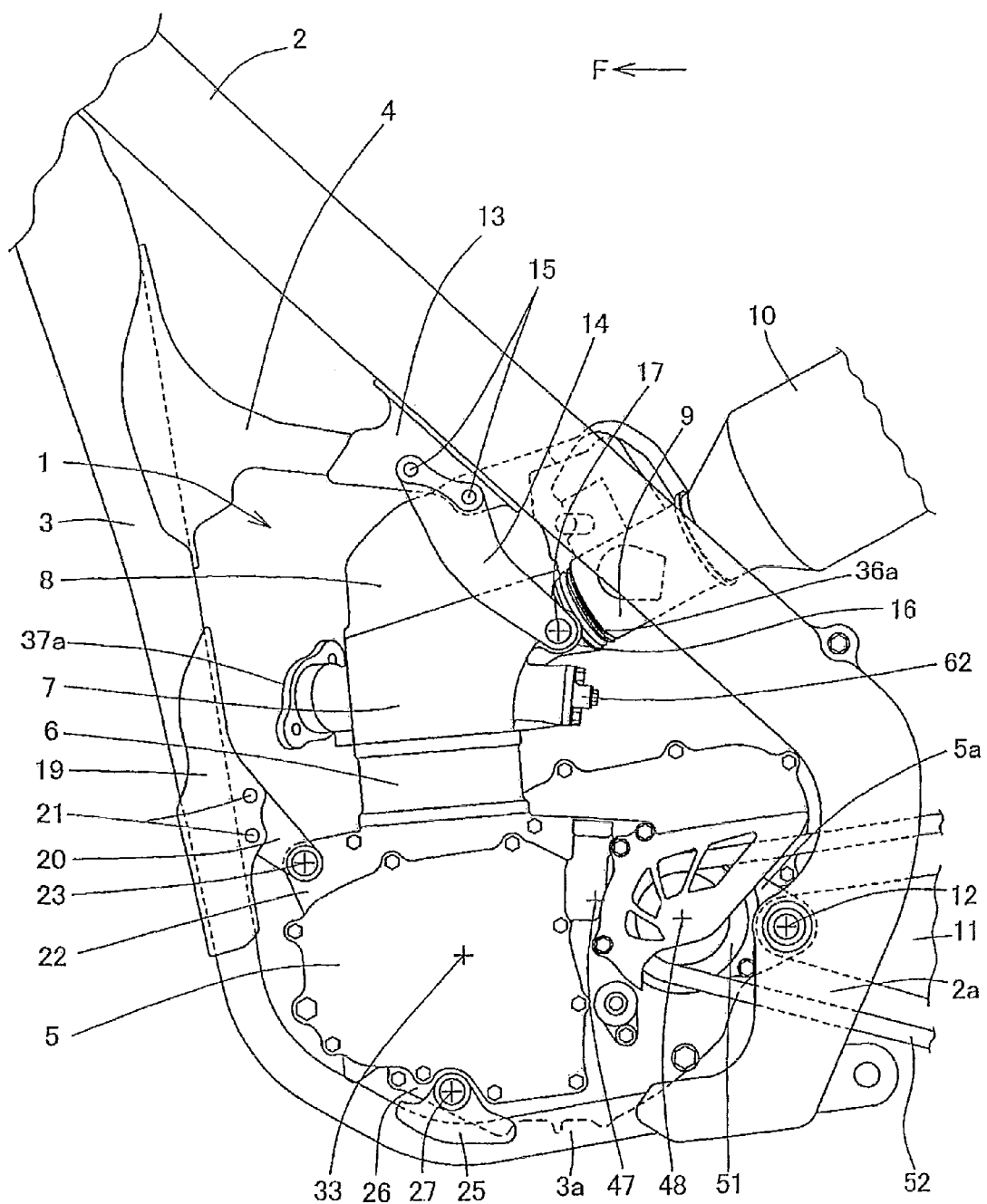
FIG. 1 is a side elevational view showing an engine according to an embodiment of the present invention.

FIG. 1 is a side elevational view showing a motorcycle engine 1 according to an embodiment of the present invention. An arrow F points in a forward direction (the same is true with the other accompanying drawings). The engine 1 is used in a sports motorcycle for off-road operation. FIG. 1 shows a condition, in which the engine 1 is fastened to a frame of the motorcycle. A main frame 2 extending obliquely downwardly toward the rear from a head pipe (not shown) is shown at the upper portion and a down frame 3 extending downwardly from the head pipe (not shown) is shown at the left portion, respectively, in FIG. 2. A short reinforcement frame 4 extends from an upper portion of the down frame 3 toward an intermediate portion of the main frame 2 and connected to the main frame 2. The main frame 2 and the down frame 3 are connected with each other at the lower right portion of FIG. 1.

The engine 1 has an outer shell that includes a crankcase 5, a cylinder block 6, a cylinder head 7, and a cylinder head cover 8. A throttle body 9 and an air cleaner 10 are connected to a rear portion of the cylinder head 7. A rear fork 11 is swingably connected to a rear portion of the crankcase 5 via a pivot 12.

The engine 1 is supported on a frame of the vehicle at four support portions disposed therearound. A bracket 13 that supports the upper portion of the engine 1 is formed at a connection between the reinforcement frame 4 and the main frame 2. An upper engine hanger 14 is attached to the bracket 13 via bolts 15. The upper engine hanger 14 extends obliquely downwardly toward the rear. The upper engine hanger 14 has a distal end fastened to an engine hanger boss 16 formed on the cylinder head 7 of the engine 1 via an upper engine hanger mounting bolt 17 so as to suspend the engine 1.

A bracket 19 that supports a front portion of the engine 1 is formed on the down frame 3. A front engine hanger 20 is fitted to the bracket 19 via bolts 21. The front engine hanger 20 has a distal end mounted, via a front engine hanger mounting bolt 23, on a mounting boss 22 disposed at a front end of the crankcase 5 of the engine 1 so as to suspend the engine 1.

A third bracket 25 that supports a lower portion of the engine 1 is formed on a rearwardly extended portion 3a at a lower portion of the down frame 3. The third bracket 25 has an upper end fastened to a mounting boss 26 on the lower portion of the engine 1 via a bolt 27 so as to support the engine 1 from below.

At a rear portion of the engine 1, a rear boss 5a of the crankcase 5 is supported by a downwardly curved portion 2a of the main frame 2 via the pivot 12 that is commonly used with the rear fork 11.

In the support structure of the engine 1 described above, the engine hanger boss 16 in particular at the upper portion of the engine 1 is disposed at a high position in the cylinder head 7. The engine hanger boss 16 is, as a result, disposed at a position close to the main frame 2, so that the upper engine hanger 14 can be built compactly and with a reduced weight. The engine hanger boss 16 can be disposed at such a high position, because a joint surface between the cylinder head 7 and the cylinder head cover 8 is inclined to have a higher rear portion side and the engine hanger boss 16 is disposed on a side of an intake port outer opening 36a that is close to the rear joint surface.

Figure 2:
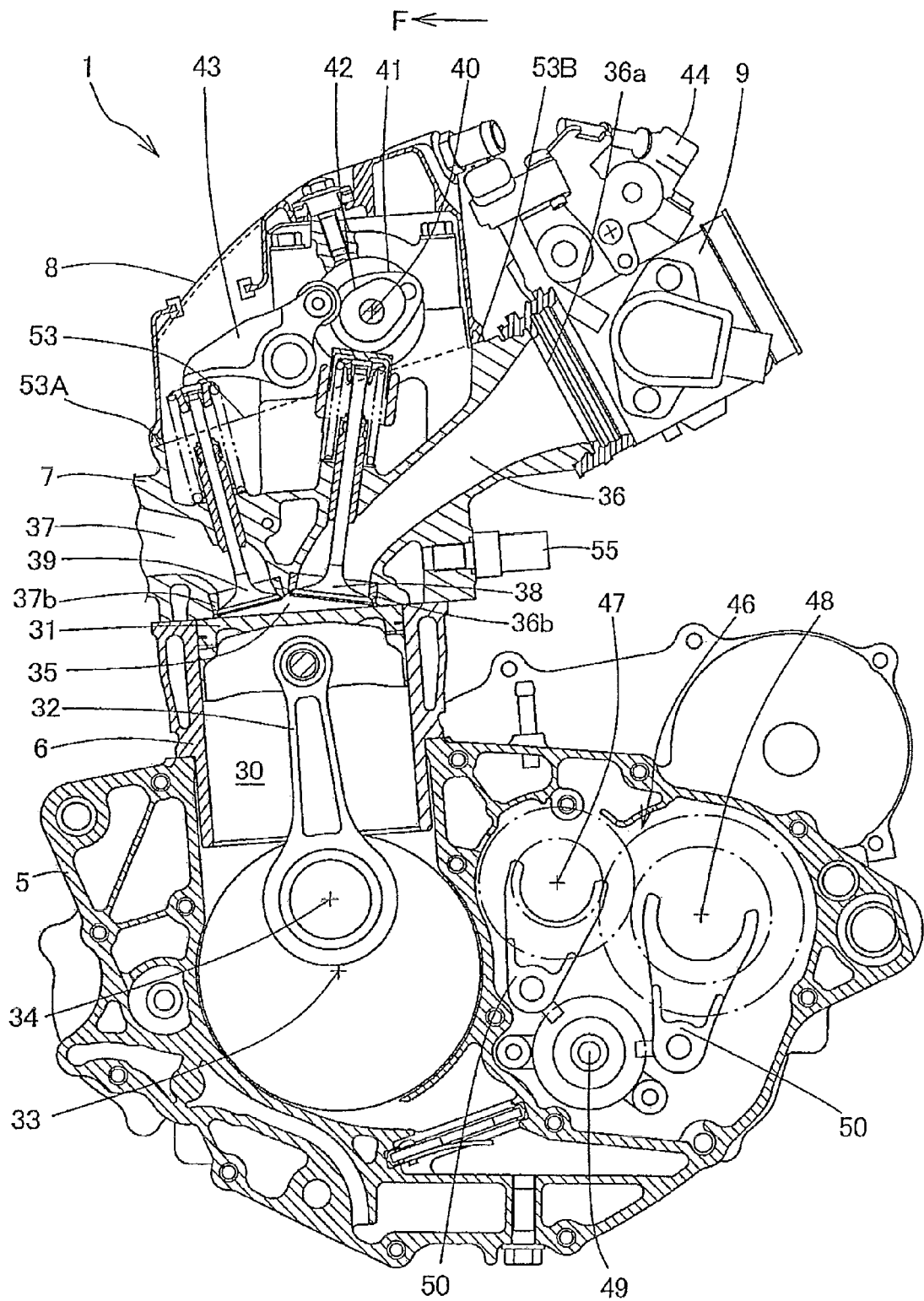
FIG. 2 is a longitudinal cross-sectional view of the engine as viewed from the left side.

FIG. 2 is a longitudinal cross-sectional view of the engine 1 as viewed from the left side. The outer shell of the engine 1 includes the crankcase 5, the cylinder block 6, the cylinder head 7, and the cylinder head cover 8. A crankshaft 33 is rotatably held in the crankcase 5. The cylinder block 6 includes a cylinder hole 30 formed therein. The cylinder hole 30 has a vertically extended tubular shape, in which a piston 31 is vertically slidably disposed. The piston 31 is connected to a crankpin 34 of the crankshaft 33 via a connecting rod 32. The cylinder hole 30, the cylinder head 7, and the piston 31 together define a combustion chamber 35. An intake port 36 and an exhaust port 37 formed in the cylinder head 7 are in communication with the combustion chamber 35. An intake valve 38 and an exhaust valve 39 are disposed at a combustion chamber side opening 36b in the intake port 36 and a combustion chamber side opening 37b in the exhaust port 37, respectively. The intake valve 38 and the exhaust valve 39 are urged in a direction to close the combustion chamber side opening 36b and the combustion chamber side opening 37b, respectively.

A camshaft 40 that opens and closes the intake valve 38 and the exhaust valve 39 is rotatably supported by the cylinder head 7. Rotation of the camshaft 40 causes a cam 41 formed on the camshaft 40 to drive directly the intake valve 38. The rotation of the camshaft 40 also causes the exhaust valve 39 to be driven via a rocker arm 43 that engages a cam 42 formed on the camshaft 40.

The throttle body 9 and the air cleaner 10 (FIG. 1) are connected to the intake port 36. The throttle body 9 is mounted with a fuel injector 44. The throttle body 9 regulates flow of air purified by the air cleaner 10 and the resultant purified air is drawn into the intake port 36.

A transmission mechanism 46 is disposed rearwardly of the crankshaft 33 inside the crankcase 5. The transmission mechanism 46 is a constant-mesh type transmission that includes a plurality of gears arranged in pairs, a shift drum 49, and a plurality of shift forks 50. More specifically, the plurality of gears is mounted on a main shaft 47 and a counter shaft 48 that are rotatably supported in the crankcase 5. The shift drum 49 engages/disengages the gears with/from the main shaft 47 and the counter shaft 48. The plurality of shift forks 50 is driven by the shift drum 49.

The counter shaft 48 at a rear portion of the crankcase 5 has a left end protruding outwardly of the crankcase 5. A rear wheel drive sprocket 51 (FIG. 1) is mounted on the left end of counter shaft 48. A rear wheel drive chain 52 (FIG. 1) is trained about the rear wheel drive sprocket 51 and a rear wheel driven sprocket mounted on a rear axle.

The engine 1 is a water-cooled engine. In the engine 1, a joint surface 53 between the cylinder head 7 and the cylinder head cover 8 is inclined such that a rear joint surface 53B is higher than a front joint surface 53A. The intake port outer opening 36a is disposed near the rear joint surface 53B. This creates a wide space downwardly of the intake port 36 in a rear surface of the cylinder head 7. A coolant temperature sensor 55 for detecting the temperature of a coolant is disposed in this wide space. In addition, the inclined joint surface 53 and an upper end of the intake port 36 disposed on a higher level allow a centerline of the intake port 36 near the intake valve 38 of the intake port 36 to be shaped substantially linearly. This improves intake efficiency.

Figure 3:
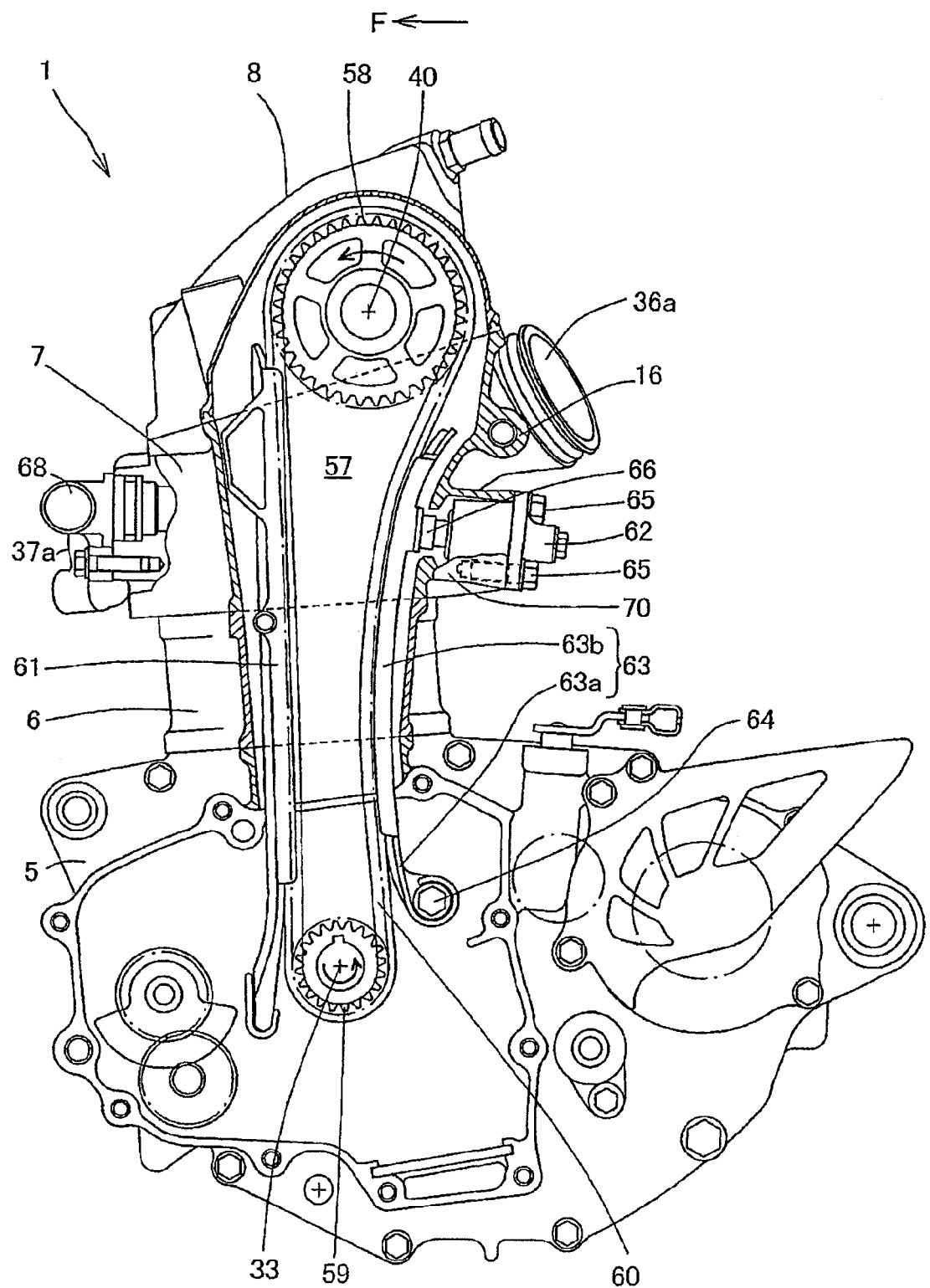
FIG. 3 is a longitudinal cross-sectional view showing a cam chain chamber of the engine.

FIG. 3 is a longitudinal cross-sectional view showing a cam chain chamber 57 of the engine 1. A camshaft driven sprocket 58 shown in FIG. 3 is disposed on the left end of the camshaft 40 shown in FIG. 2. A cam chain 60 is trained about the camshaft driven sprocket 58 and a camshaft drive sprocket 59 disposed on the crankshaft 33. A fixed cam chain guide 61 made of a synthetic resin for guiding the cam chain 60 is disposed on a side of the cam chain 60 pulled by the camshaft drive sprocket 59 (the forward side in the direction of travel). A cam chain tensioner 63 pushed by a tensioner lifter 62 is disposed on a side of the cam chain 60 fed off from the camshaft drive sprocket 59 (the rearward side in the direction of travel). The cam chain tensioner 63 prevents slack in the cam chain 60. The cam chain tensioner 63 includes an arm 63a made of an elastic material and a shoe 63b made of a synthetic resin mounted on a side of the arm 63a that slides over the cam chain 60. The cam chain tensioner 63 has a lower end swingably supported by a fixed tensioner lower end bolt 64 and an upper end that forms a free end. The tensioner lifter 62 is attached on a tensioner lifter mounting portion 70 using a tensioner lifter mounting bolt 65. The tensioner lifter mounting portion 70 is disposed downwardly of the engine hanger boss 16 on the left of the intake port outer opening 36a at the rear portion of the cylinder head 7. A protruding shaft 66 at the center of the tensioner lifter 62 advances into the cam chain chamber 57 to press the cam chain tensioner 63 toward the cam chain 60, thereby inhibiting oscillation of the cam chain 60. The protruding shaft 66 of the tensioner lifter 62 presses an area near the free end of the cam chain tensioner 63 to thereby effectively inhibit oscillation of the cam chain 60. The cylinder head 7 includes an exhaust port outer opening 37a formed in a front surface thereof (see also FIG. 1). A thermostat 68 is disposed beside the exhaust port outer opening 37a.

Figure 4:
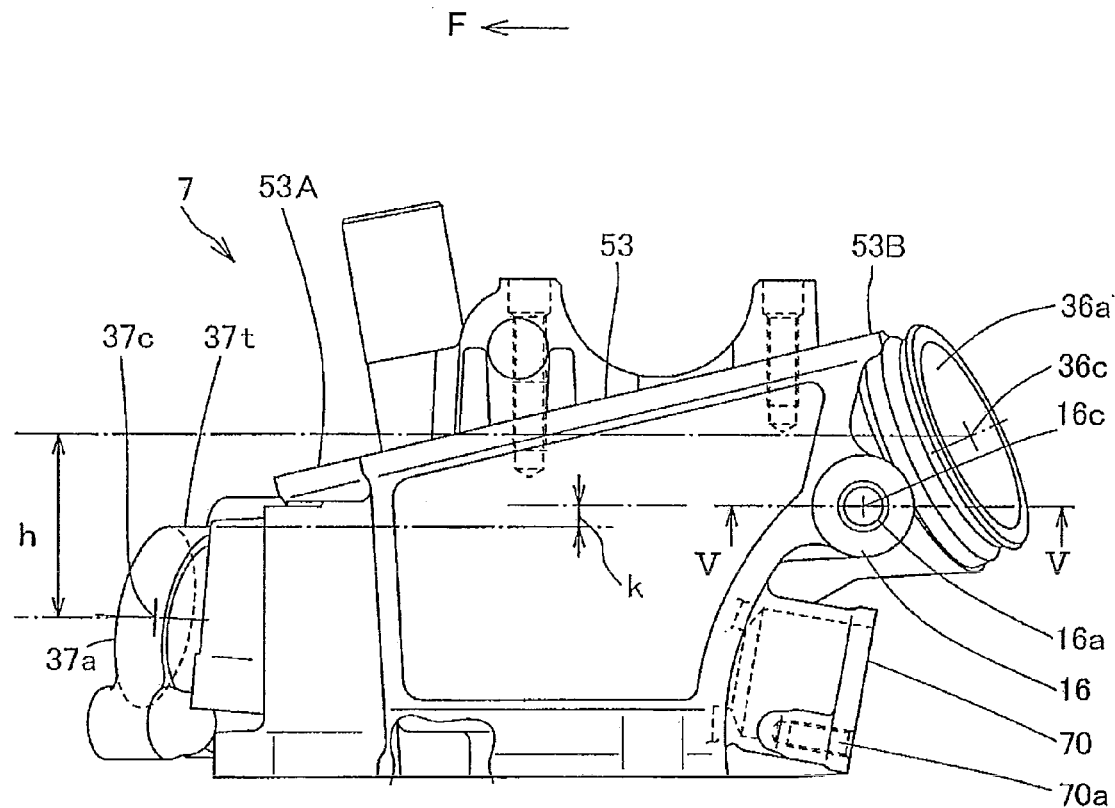
FIG. 4 is a left side elevational view of the cylinder head.

FIG. 4 is a left side elevational view of the cylinder head 7. The intake port outer opening 36a is disposed in the rear surface of the cylinder head 7, while the exhaust port outer opening 37a is disposed in the front surface of the cylinder head 7. The joint surface 53 to be joined with the cylinder head cover 8 is inclined such that the rear joint surface 53B is higher than the front joint surface 53A. The intake port outer opening 36a is open to a part near the upper surface at the rear portion of the cylinder head 7. The intake port outer opening 36a has a center 36c that is disposed upwardly of a center 37c of the exhaust port outer opening 37a by a height h.

The engine hanger bosses 16 are disposed on both right and left sides of the intake port outer opening 36a. The tensioner lifter mounting portion 70 is disposed downwardly of the engine hanger boss 16. The tensioner lifter mounting portion 70 includes a threaded hole 70a formed therein, into which the tensioner lifter mounting bolt 65 can be screwed.

Figure 5:
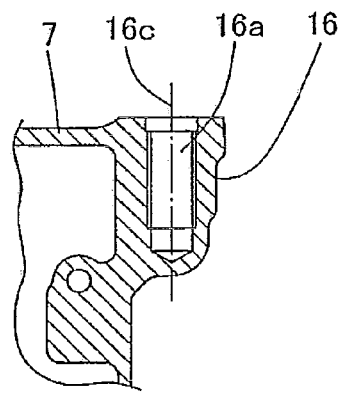
FIG. 5 is a cross-sectional view taken along line V-V of FIG. 4.

FIG. 5 is a cross-sectional view taken along line V-V of FIG. 4. The engine hanger boss 16 includes a threaded hole 16a formed therein, into which the upper engine hanger mounting bolt 17 is screwed. A centerline 16c of the threaded hole 16a is provided. Referring to FIG. 4, the centerline 16c of the threaded hole 16a in the engine hanger boss 16 is disposed upwardly of an upper end 37t of the exhaust port outer opening 37a by a height k.

Figure 6:
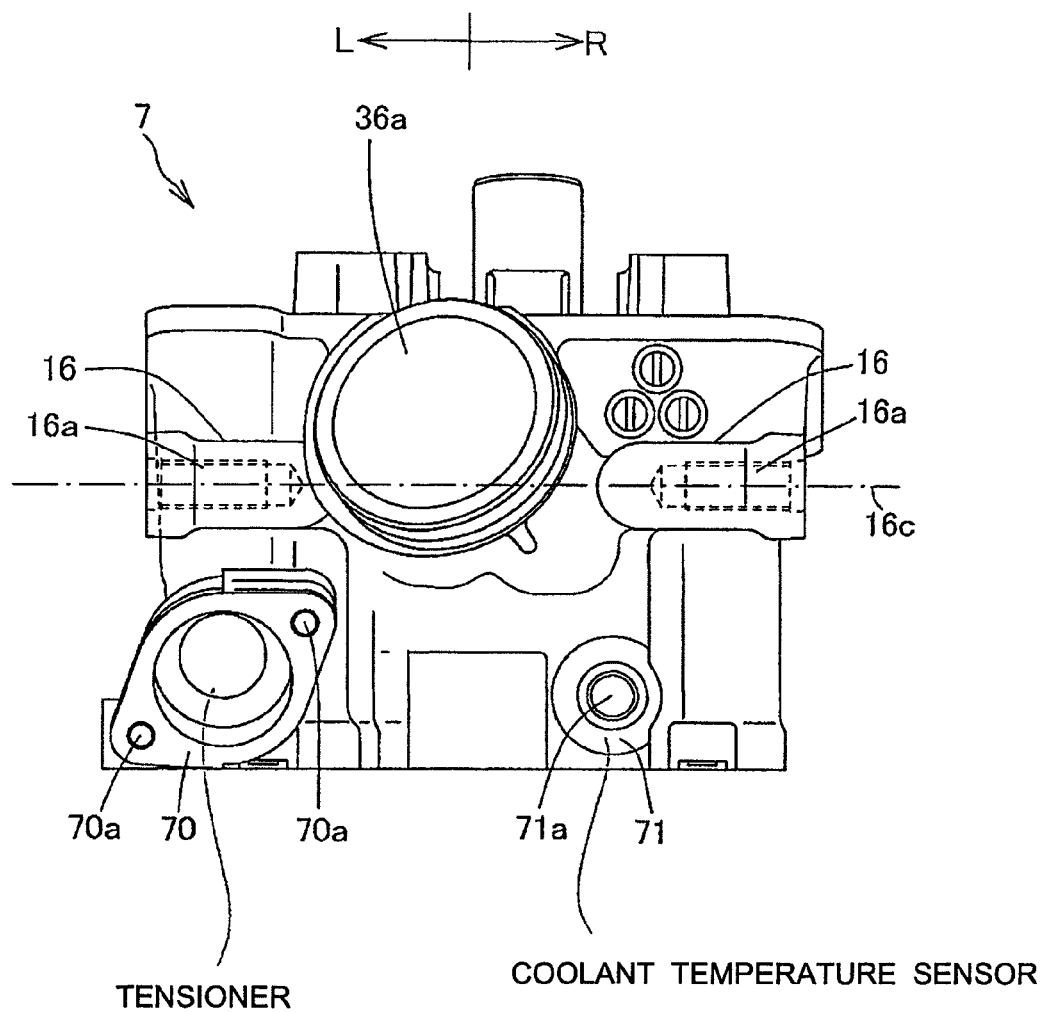
FIG. 6 is a rear view of the cylinder head.

FIG. 6 is a rear view of the cylinder head 7. An arrow L points toward the left and an arrow R points toward the right. A pair of engine hanger bosses 16 is disposed on the right and left sides of the intake port outer opening 36a. The centerline 16c of the engine hanger bosses 16 crosses the intake port 36 (see also FIG. 4). The tensioner lifter mounting portion 70 is disposed downwardly of the left engine hanger boss 16. The tensioner lifter mounting portion 70 includes the threaded hole 70a formed therein, into which the tensioner lifter mounting bolts 65 is screwed. A coolant temperature sensor mounting portion 71 is disposed downwardly of the right engine hanger boss 16. The coolant temperature sensor mounting portion 71 includes a threaded hole 71a formed therein, into which the coolant temperature sensor 55 is screwed. The tensioner lifter 62 and the coolant temperature sensor 55 are disposed at an overlapping position in a side view.

Figure 7:
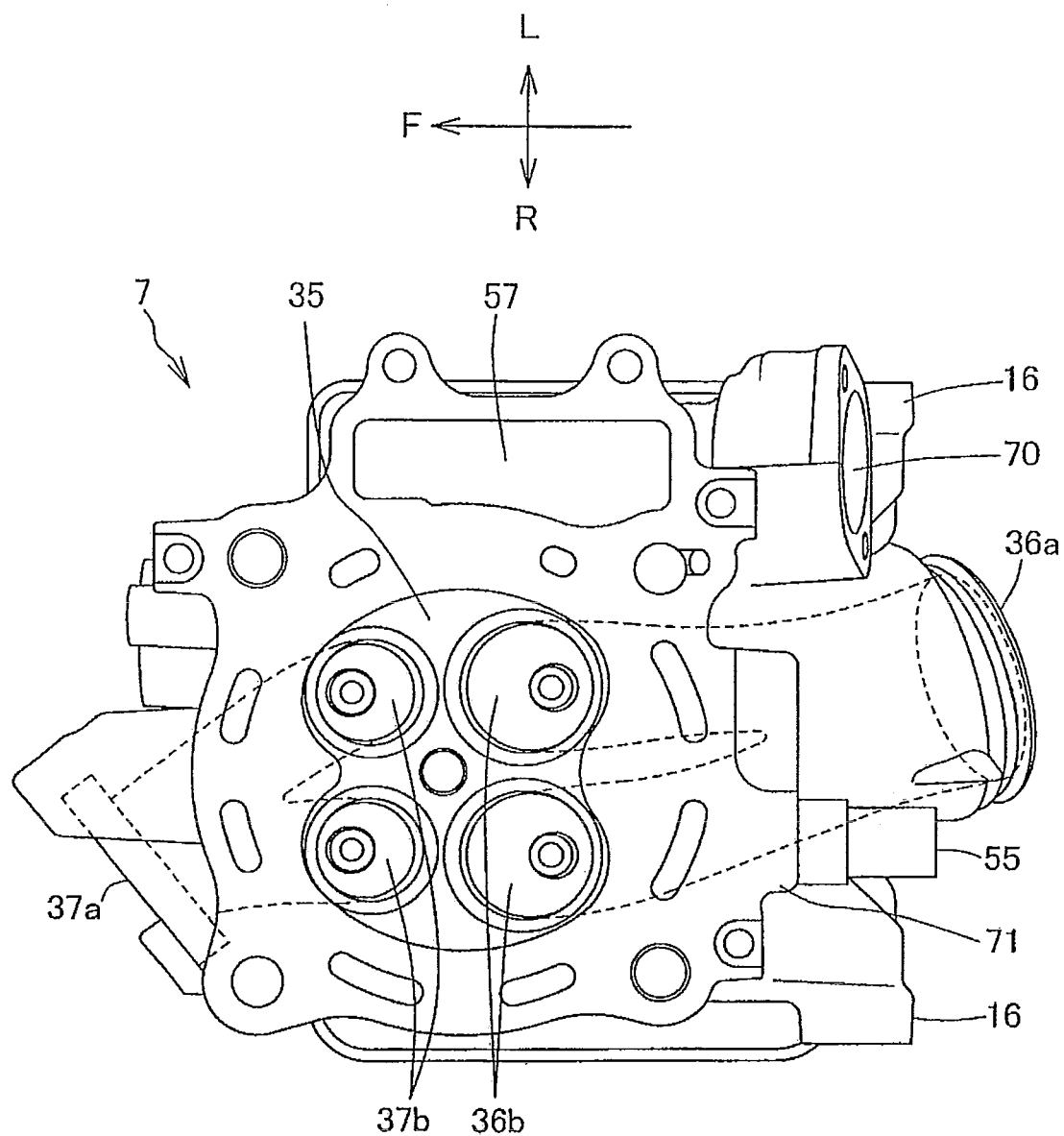
FIG. 7 is a bottom plan view of the cylinder head.

FIG. 7 is a bottom plan view of the cylinder head 7. The two intake port combustion chamber side openings 36b and the two exhaust port combustion chamber side openings 37b are disposed in a center recess that serves as the combustion chamber 35. The cam chain chamber 57 is open to the left of the cylinder head 7. The exhaust port outer opening 37a is disposed in the front surface of the cylinder head 7. The intake port outer opening 36a, the left and right engine hanger bosses 16, the tensioner lifter mounting portion 70, and the coolant temperature sensor mounting portion 71 are disposed on the rear surface of the cylinder head 7. FIG. 7 shows a condition, in which the coolant temperature sensor 55 is mounted.

The embodiment of the present invention described in detail heretofore offers the following effects.

A pair of engine hanger bosses is disposed, each being disposed on either side of the cylinder head. This allows the intake port to be disposed in the area between the two engine hanger bosses. Further, the engine hanger bosses and the intake port are disposed on a relatively high level of the cylinder head, so that the engine hanger bosses are disposed near the main frame. The upper engine hanger can therefore be built compactly and with a reduced weight. The centerline of the intake port near the intake valve 38 can be shaped substantially linearly, which helps improve intake efficiency. Moreover, the coolant temperature sensor and the cam chain tensioner lifter are disposed downwardly of the engine hanger boss and the intake port outer opening. This allows the coolant temperature sensor and the cam chain tensioner lifter to be compactly disposed in the cylinder head without having to enlarge the cylinder head.

(2) The exhaust port of the cylinder head is disposed at a low level, while disposing the intake port at an upper portion of the cylinder head. The intake port outer opening, the engine hanger boss, the coolant temperature sensor, and the cam chain tensioner lifter are thereby disposed centrally in the rear portion of the cylinder head. This helps suppress an increase in mass of the cylinder head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle engine comprising:
   a cylinder block disposed in a vehicle to have an axis extending perpendicularly or slightly inclined forwardly; and
   a cylinder head and a cylinder head cover defining a joint surface therebetween, said joint surface being inclined such that the rear joint surface is higher than the front joint surface, said cylinder head including:
   an intake port;
   an exhaust port disposed on a front surface of the cylinder head opposite the intake port;
   an engine hanger boss;
   a coolant temperature sensor mounting portion; and
   a cam chain tensioner lifter; wherein:
   the intake port has an outer opening having a center disposed on a level upward of a center of an outer opening of the exhaust port, an upper end of the outer opening of the intake port being disposed near the rear joint surface;
   a camshaft and a rocker arm disposed higher than said joint surface;
   the engine hanger boss provided on either side of the cylinder head, the engine hanger boss has a centerline that crosses the intake port, and is disposed upwardly of an upper end of the outer opening of the exhaust port; and
   the cam chain tensioner lifter and the coolant temperature sensor mounting portion are disposed at an overlapping position in a side view, downwardly of the engine hanger boss and an open end of the intake port,
   wherein the center of a camshaft driven sprocket is located higher than the joint surface and the camshaft driven sprocket and the joint surface are disposed in an overlapping position, in side view, and a tension lifter is attached to a tension lifter mounting portion using a tensioner lifter mounting bolt, and wherein the tensioner lifter mounting portion is disposed downwardly of the engine hanger boss on the left of the intake port outer opening at the rear portion of the cylinder head.

2. The engine according to claim 1, and further including a bracket for attachment to an upper engine hanger and to the engine hanger boss for mounting the engine relative to the vehicle.

3. The engine according to claim 2, wherein the engine boss is disposed at an upper portion of the engine at a high position close to a main frame of the vehicle for enabling the upper engine hanger to be compact and light weight.

4. The engine according to claim 1, wherein the intake port is disposed in a rear surface of the cylinder head at an upper portion of the cylinder head wherein the coolant temperature sensor mounting portion and the cam chain tensioner lifter are disposed in an area downwardly from the intake port.

5. The engine according to claim 1, and further including a fixed cam chain guide displaced relative to a cam chain tensioner, the cam chain tensioner lifter being operatively connected to the cam chain tensioner for selectively adjusting the tension in a cam chain.

6. The engine according to claim 5, wherein said cam chain tensioner includes an arm for engaging the cam chain and a shoe for sliding over the cam chain, said cam chain tensioner being swingably supported at a proximal end thereof and being free at a distal end thereof, said cam chain tensioner lifter being disposed to engage the cam chain tensioner at a point between the proximal end and the distal end.

7. The engine according to claim 6, wherein the cam chain tensioner lifter being disposed adjacent to the distal end of the cam chain tensioner for inhibiting oscillation of the cam chain.

8. The engine according to claim 1, wherein the intake port includes an outer opening having a center disposed upwardly of the center of the outer opening of the exhaust port by a predetermined height.

9. The engine according to claim 1, wherein the engine hanger boss includes a first threaded hole disposed on one side of the intake port and a second threaded hole disposed on another side of the intake port for mating with engine hanger mounting bolts.

10. A cylinder head for a motorcycle engine comprising:
an exhaust port;
an intake port including an outer opening having a center disposed on a level upward of a center of an outer opening of the exhaust port, said exhaust port being disposed on a front surface of the cylinder head opposite the intake port, said cylinder head including a cylinder head cover defining a joint surface therebetween, said joint surface being inclined such that the rear joint surface is higher than the front joint surface;
an upper end of the outer opening of the intake port is disposed near the rear joint surface;
a camshaft and a rocker arm disposed higher than said joint surface;
an engine hanger boss;
a coolant temperature sensor mounting portion; and
a cam chain tensioner lifter;
wherein the engine hanger boss provided on either side of the cylinder head includes a centerline that crosses the intake port, and is disposed upwardly of an upper end of the outer opening of the exhaust port; and
the cam chain tensioner lifter and the coolant temperature sensor mounting portion are disposed at an overlapping position in a side view, downwardly of the engine hanger boss and an open end of the intake port,
wherein the center of a camshaft driven sprocket is located higher than the joint surface and the camshaft driven sprocket and the joint surface are disposed in an overlapping position, in side view, and a tension lifter is attached to a tension lifter mounting portion using a tensioner lifter mounting bolt, and
wherein the tensioner lifter mounting portion is disposed downwardly of the engine hanger boss on the left of the intake port outer opening at the rear portion of the cylinder head.

11. The engine according to claim 10, and further including a bracket for attachment to an upper engine hanger and to the engine hanger boss for mounting the engine relative to a vehicle.

12. The engine according to claim 11, wherein the engine boss is disposed at an upper portion of the engine at a high position close to a main frame of a vehicle for enabling the upper engine hanger to be compact and light weight.

13. The engine according to claim 10, wherein the intake port is disposed in a rear surface of the cylinder head at an upper portion of the cylinder head wherein the coolant temperature sensor mounting portion and the cam chain tensioner lifter are disposed in an area downwardly from the intake port.

14. The engine according to claim 10, and further including a fixed cam chain guide displaced relative to a cam chain tensioner, the cam chain tensioner lifter being operatively connected to the cam chain tensioner for selectively adjusting the tension in a cam chain.

15. The engine according to claim 14, wherein said cam chain tensioner includes an arm for engaging the cam chain and a shoe for sliding over the cam chain, said cam chain tensioner being swingably supported at a proximal end thereof and being free at a distal end thereof, said cam chain tensioner lifter being disposed to engage the cam chain tensioner at a point between the proximal end and the distal end.

16. The engine according to claim 15, wherein the cam chain tensioner lifter being disposed adjacent to the distal end of the cam chain tensioner for inhibiting oscillation of the cam chain.

17. The engine according to claim 10, wherein the intake port includes an outer opening having a center disposed upwardly of the center of the outer opening of the exhaust port by a predetermined height.

18. The engine according to claim 10, wherein the engine hanger boss includes a first threaded hole disposed on one side of the intake port and a second threaded hole disposed on another side of the intake port for mating with engine hanger mounting bolts.

19. The engine according to claim 1, wherein the engine hanger boss is provided on both sides of the intake part outer opening of the cylinder head, said engine hanger bosses having a centerline which laterally crosses the intake part.

20. The engine according to claim 19, wherein the tensioner lifter is disposed downwardly of one of the engine hangers, and the coolant temperature sensor mounting portion is disposed downwardly of the other of said engine hangers.

21. The engine according to claim 1, wherein the intake part is disposed near an intake valve enabling the intake port to be shaped with a substantially straight configuration.

22. The engine according to claim 1, said engine being a single cylinder engine.

* * * * *